(12) United States Patent
Nishihara et al.

(10) Patent No.: US 8,254,081 B2
(45) Date of Patent: Aug. 28, 2012

(54) LAMINATED CERAMIC ELECTRONIC COMPONENT AND MANUFACTURING METHOD THEREOF

(75) Inventors: Seiichi Nishihara, Kameoka (JP); Shuji Matsumoto, Omihachiman (JP); Akihiro Motoki, Fukui (JP); Makoto Ogawa, Fukui (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 386 days.

(21) Appl. No.: 12/617,879

(22) Filed: Nov. 13, 2009

(65) Prior Publication Data

US 2010/0128412 A1    May 27, 2010

(30) Foreign Application Priority Data

Nov. 26, 2008 (JP) ................... 2008-300385

(51) Int. Cl.
*H01G 4/00* (2006.01)
(52) U.S. Cl. .................. 361/300; 361/321.2; 361/306.3; 361/306.1; 361/303; 361/311
(58) Field of Classification Search ............... 361/321.2, 361/306.3, 306.1, 303, 311
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 7,808,770 B2 * | 10/2010 | Itamura et al. | ................ 361/309 |
| 2005/0046536 A1 | 3/2005 | Ritter et al. | |

(Continued)

FOREIGN PATENT DOCUMENTS

JP 2005-340663 A 12/2005
(Continued)

OTHER PUBLICATIONS

Motoki et al.; "Multilayer Electronic Component and Method for Manufacturing the Same"; U.S. Appl. No. 12/110,484, filed Apr. 28, 2008.
Motoki et al.; "Multilayer Ceramic Electronic Component and Method for Manufacturing the Same"; U.S. Appl. No. 12/356,648, filed Jan. 21, 2009.

(Continued)

*Primary Examiner* — Nguyen T Ha
*Assistant Examiner* — Hung Dang
(74) *Attorney, Agent, or Firm* — Keating & Bennett, LLP (57) ABSTRACT

In a laminated ceramic electronic component in which, by directly carrying out a plating process on an outer surface of a component main body, an external electrode is formed thereon, an attempt is made to improve the adhesion strength between a plated film forming the external electrode and the component main body. A brazing material containing Ti is applied to at least one portion of a surface on which external electrodes of a component main body is formed, and by baking this brazing material, a metal layer containing Ti is formed. Moreover, the external electrodes are formed by a plating process so as to coat at least the metal layer, and a heating process is then carried out so as to cause counter diffusion between the metal layer and the plated film that is to form the external electrodes.

6 Claims, 7 Drawing Sheets

U.S. PATENT DOCUMENTS

| | | |
|---|---|---|
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |

FOREIGN PATENT DOCUMENTS

| | | |
|---|---|---|
| JP | 2008-41786 A | 2/2008 |

OTHER PUBLICATIONS

Iwanaga et al.; "Monolithic Ceramic Electronic Component and Method for Manufacturing the Same"; U.S. Appl. No. 12/405,370, filed Mar. 17, 2009.

Iwanaga et al.; "Multilayer Ceramic Electronic Component and Method for Producing Same"; U.S. Appl. No. 12/405,372, filed Mar. 17, 2009.

Kayatani et al.; "Multilayer Ceramic Electronic Component and Method for Making the Same"; U.S. Appl. No. 12/469,799, filed May 21, 2009.

Takeuchi et al.; "Multilayer Ceramic Electronic Component and Manufacturing Method Thereof"; U.S. Appl. No. 12/340,570, filed Dec. 19, 2008.

Kobayashi et al.; "Multilayer Ceramic Electronic Component and Method for Making the Same"; U.S. Appl. No. 12/490,471, filed Jun. 24, 2009.

Takeuchi et al., "Multilayer Electronic Component and Method for Manufacturing the Same", U.S. Appl. No. 12/817,352, filed Jun. 17, 2010.

Saruban et al., "Laminated Ceramic Electronic Component and Manufacturing Method Therefor", U.S. Appl. No. 12/821,305, filed Jun. 23, 2010.

* cited by examiner

LAMINATED CERAMIC ELECTRONIC COMPONENT AND MANUFACTURING METHOD THEREOF

BACKGROUND OF THE INVENTION

1. Field of the Invention

The present invention relates to a laminated ceramic electronic component and its manufacturing method, and more particularly, relates to a laminated ceramic electronic component in which an external electrode is formed on an outer surface of a component main body by directly carrying out a plating process thereon, and a manufacturing method thereof.

2. Description of the Related Art

There have been demands for miniaturizing the size of a laminated ceramic electronic component, such as a laminated ceramic capacitor. For example, in the laminated ceramic capacitor, when the component main body is miniaturized in an attempt to satisfy the demands for small size, in general, its electrostatic capacity becomes smaller. Therefore, it is proposed to make the volume of the electrode smaller as a measure that can satisfy the demands for small size.

Conventionally, the external electrode generally has a layer structure in which, on a thick-film layer that is formed by baking a conductive paste formed thereon by a dipping method as an undercoat layer, a plated film is formed. In this case, if the thick film layer to be formed by the baking process of the conductive paste is omitted so that the external electrode can be formed by using only the plated film, the thickness of the external electrode can be made much thinner. Therefore, the miniaturization of the laminated ceramic capacitor is successfully achieved accordingly, or the corresponding saved space can be used for the capacity formation portion in the component main body.

For example, JP-A No. 2005-340663 has proposed a laminated ceramic capacitor in which the external electrode is formed only by the plated film as described above. JP-A No. 2005-340663 has proposed a structure in which, so as to connect exposed portions of a plurality of inner electrodes on an end surface of a component main body, a plated film is directly formed on the end surface by using an electroless plating process so that the external electrode is formed. Moreover, in JP-A No. 2005-340663, in order to form the external electrode so as to wrap around one portion of each of two main surfaces that are adjacent to each other on the end surfaces of the component main body, dummy electrodes are formed by using the same formation method as that of the inner electrode, and the dummy electrodes are also exposed to the main surface sides of the component main body.

In the laminated ceramic capacitor described in JP-A No. 2005-340663, however, moisture tends to invade along an interface between the plated external electrode and the component main body to cause a problem in which the insulating resistance is lowered. In particular, it is found that the invasion of moisture from the tip portion of the external electrode positioned on each of two main surfaces of the component main body becomes conspicuous.

In order to solve this problem, JP-A No. 2008-41786 has proposed a structure in which, in the external electrode, a dummy electrode containing glass frit is formed between a wraparound portion on one portion of each of the main surfaces of the component main body and the component main body with a baking process.

In accordance with the structure described in JP-A No. 2008-41786, since the gap between the wraparound portion of the main surface of the external electrode and the component main body is filled with the glass frit contained in the dummy electrode, it is possible to prevent moisture from invading into the gap. Therefore, it becomes possible to suppress degradation of the insulating resistance of a laminated ceramic electronic component, such as a laminated ceramic capacitor, and consequently to improve the moisture load resistant property.

Upon adopting the structure described in JP-A No. 2008-41786, floated glass tends to occur on the surface of the dummy electrode, and when such floated glass occurs, the plated film to form the external electrode tends to fail to be deposited in a preferable state. Moreover, depending on the kinds of plating liquids, the floated glass is fused to allow the plating liquid to invade into the dummy electrode. These problems give adverse effects to the reliability of the laminated ceramic electronic component.

SUMMARY OF THE INVENTION

Preferred embodiments of the present invention provide a laminated ceramic electronic component and a manufacturing method thereof, which solve the above-mentioned problems.

According to a preferred embodiment of the present invention, a method for manufacturing a laminated ceramic electronic component that is configured by a plurality of laminated ceramic layers and an inner electrode that is formed along a specific interface between the ceramic layers, and includes a component main body having first and second main surfaces that oppose each other, first and second end surfaces that connect the first and second main surfaces with each other, and first and second side surfaces, with one portion of an end edge of the inner electrode being exposed to at least one of the first and second end surfaces of the component main body, and an external electrode that is formed at least on the end surface of the component main body to which the inner electrode is exposed, is provided.

The method for manufacturing a laminated ceramic electronic component according to a preferred embodiment of the present invention includes the steps of: preparing the component main body; applying a brazing material containing Ti to at least one portion of a surface of the component main body where the external electrode is to be formed; baking the brazing material so that a metal layer is formed on the component main body; carrying out a plating process so that a plated film that forms at least one portion of the external electrode is formed so as to cover at least a portion to which the inner electrode is exposed and a portion in which the meal layer is formed, in the component main body; and carrying out a heating process so that a counter diffusion is caused between the metal layer and the plated film.

In the step of applying the brazing material, the brazing material is preferably applied only onto a ceramic portion except for the portion to which the inner electrode is exposed in the component main body.

Preferably, the brazing material further includes Ag and Cu.

Another preferred embodiment of the present invention is directed to a structure of a laminated ceramic electronic component manufactured by using the above-mentioned manufacturing method.

An electronic ceramic component, which is configured by a plurality of laminated ceramic layers and an inner electrode that is arranged along a specific interface between the ceramic layers, includes: a component main body having first and second main surfaces that oppose each other, first and second end surfaces that connect the first and second main surfaces with each other, and first and second side surfaces, with one portion of an end edge of the inner electrode being exposed to at least one of the first and second end surfaces of the component main body; an external electrode that is formed at least on the end surface of the component main body to which the inner electrode is exposed, by directly carrying out a plating process thereon; a metal layer containing Ti that is located between the component main body and the external electrode; and a counter diffusion layer having a thickness of about 0.1 μm or more, for example, that is located between the external electrode and the metal layer.

Preferably, the metal layer is located only on a surface of the ceramic portion except for the portion to which the inner electrode is exposed in the component main body.

Preferably, the metal layer mainly includes an Ag—Cu—Ti alloy, for example.

In accordance with various preferred embodiments of the present invention, by applying a brazing material containing Ti to at least one portion of a surface of a component main body on which an external electrode is to be formed so as to be baked thereon, a ceramic portion possessed by the component main body and Ti are firmly combined with each other through oxygen so that the surface of the ceramic component is metalized. Moreover, the metalized portion on the ceramic surface and a plated film forming at least one portion of the external electrode are allowed to form a metal-to-metal bond by a heating treatment. Therefore, the adhesion strength between the plated film forming the external electrode and the ceramic portion can be improved. As a result, it becomes possible to prevent moisture from invading into the gap between the external electrode and the component main body, while improving the moisture load resistant property of the laminated ceramic electronic component.

In a method for forming the laminated ceramic electronic component according to a preferred embodiment of the present invention, when the brazing material is designed to be applied only onto a ceramic portion except for the portion to which the inner electrode is exposed in the component main body, it is possible to obtain greater effects, while the volume increase of the laminated ceramic electronic component due to the application of the brazing material being kept to a minimum.

In the method for manufacturing a laminated ceramic electronic component in accordance with a preferred embodiment of the present invention, when the brazing material further contains Ag and Cu in addition to Ti, it is possible to lower the temperature required for baking the brazing material, while further increasing the joining strength between the ceramic portion possessed by the component main body and the external electrode.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENT

Figure 1:
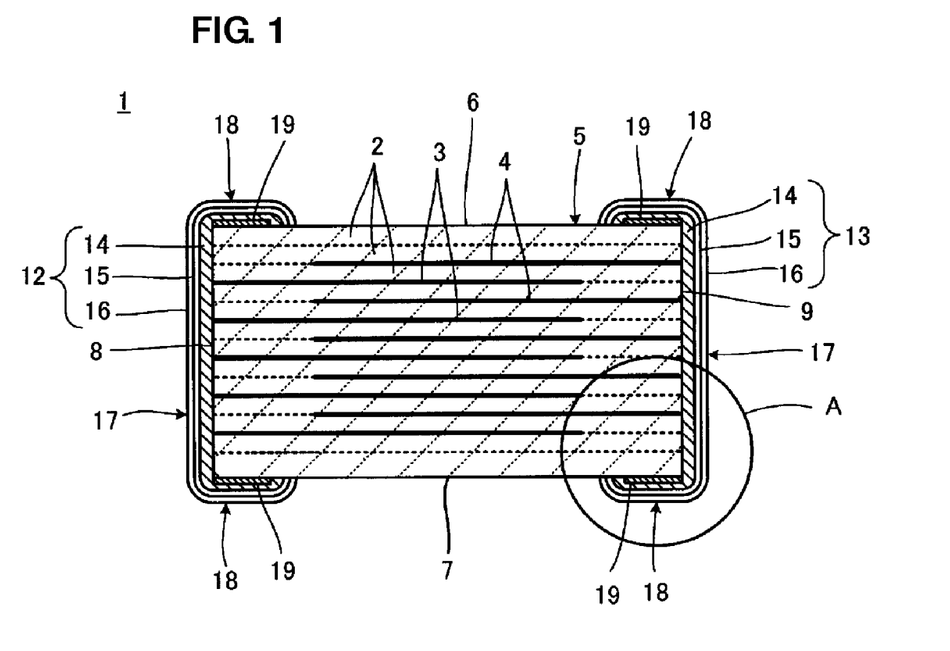
FIG. 1 is a front view that shows a laminated ceramic electronic component 1 in its cross section in accordance with a preferred embodiment of the present invention.

FIG. 1 is a front view that shows a laminated ceramic electronic component 1 in its cross section in accordance with a preferred embodiment of the present invention. The laminated ceramic electronic component 1, shown in the FIG. 1, forms a laminated ceramic capacitor.

The laminated ceramic electronic component 1 is provided with a component main body 5 including a plurality of laminated ceramic layers 2 and first and second inner electrodes 3 and 4 that are formed along a specific interface between the ceramic layers 2. The ceramic layer 2 is made from, for example, a barium-titanate-based dielectric ceramic material. The inner electrodes 3 and 4 contain, for example, Ni as a conductive component.

The component main body 5 preferably has a rectangular parallelepiped shape, for example, and is provided with first and second main surfaces 6 and 7 that are arranged face to face with each other, first and second end surfaces 8 and 9 that couple the first and second main surfaces 6 and 7 to each other, and first and second side surfaces (not shown in FIG. 1, which extend in parallel with the page space of FIG. 1).

The first and second inner electrodes 3 and 4 are alternately disposed in the lamination direction of the ceramic layers 2, with the ceramic layer 2 being interposed therebetween, so as to form an electrostatic capacity. The first inner electrode 3 has one portion of its end edge exposed to the first end surface 8 of the component main body 5 and the second inner electrode 4 also has one portion of its end edge exposed to the second end surface 9 of the component main body 5.

On the first and second end surfaces 8 and 9 of the component main body 5, first and second external electrodes 12 and 13 are respectively formed. Each of the external electrodes 12 and 13 is formed by directly carrying out a plating process on each of the end surfaces 8 and 9, and in this preferred embodiment, it is provided with a first plated film 14, for example, made from copper, a second plated film 15 formed on the first plated film 14, for example, made from nickel, and a third plated film 16 formed on the second plated film 15, for example, made from tin or gold.

Each of the external electrodes 12 and 13 has a main portion that is positioned on each of the end surfaces 8 and 9 of the component main body 5 and a wraparound portion 18 that wraps around one portion of each of first and second main surfaces 6 and 7.

Figure 2:
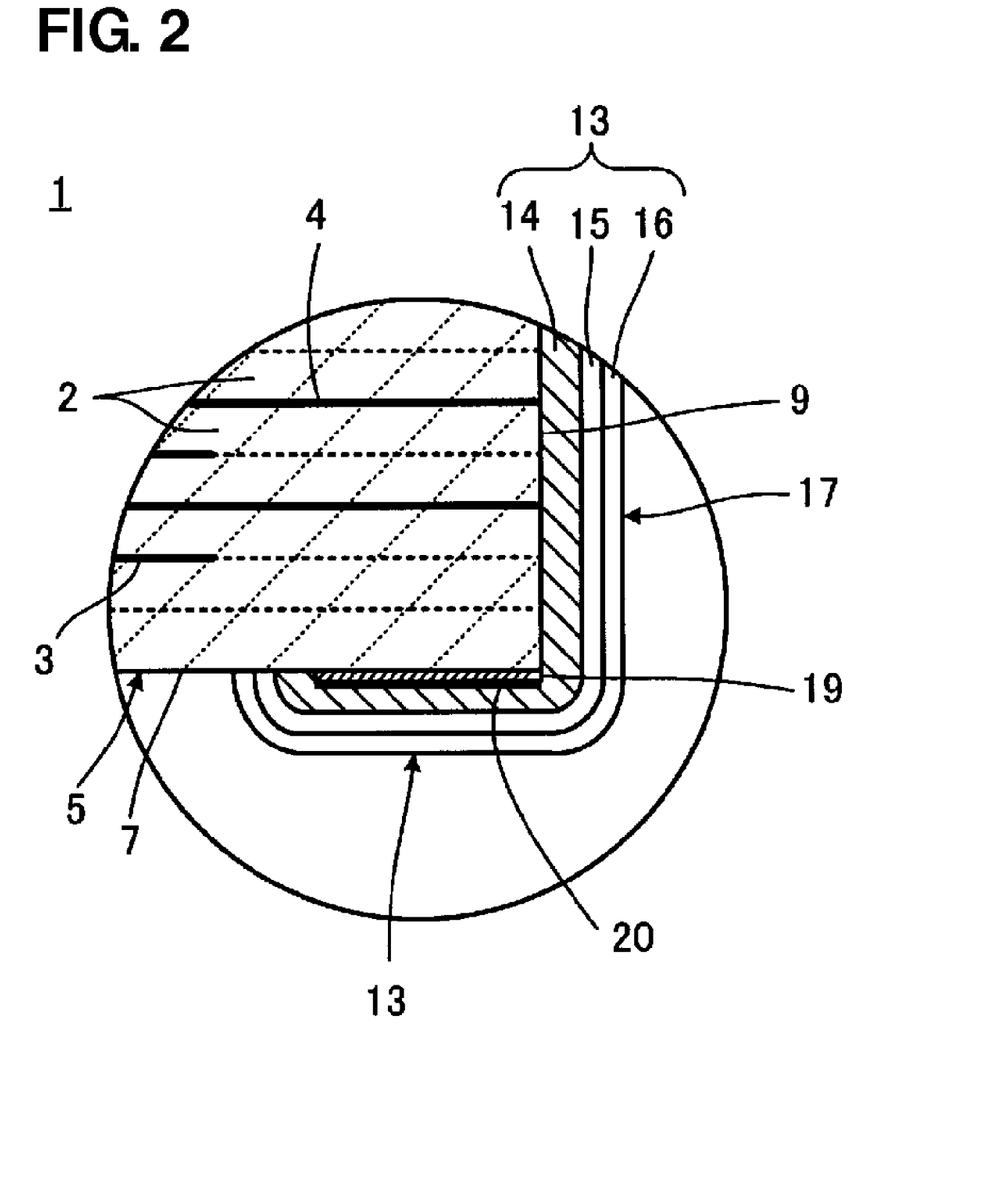
FIG. 2 is an enlarged view that shows a portion A of FIG. 1.

FIG. 2 is an enlarged view obtained by enlarging a portion A of FIG. 1.

As shown in FIGS. 1 and 2, a metal layer 19 containing Ti is located between the component main body 5 and the respective external electrodes 12 and 13, and a counter diffusion layer 20 (in particular, see FIG. 2) having a thickness of about 1 μm or more, for example, is further located between the respective external electrodes 12 and 13 and the metal layer 19. The method for forming the metal layer 19 and the reason for forming the counter diffusion layer 20 will be described later.

As shown in the Figures, the metal layer 19 is preferably formed only on the surface of the ceramic component except for the portions to which the inner electrodes 3 and 4 are exposed in the component main body 5. In this preferred embodiment, the metal layer 19 is formed between the respective wraparound portions 18 of the external electrodes 12 and 13 and the respective main surfaces 6 and 7 of the component main body 5. Although not shown in the Figures, in a case where the external electrodes 12 and 13 have wraparound portions up onto one portion of each of the first and second side surfaces of the component main body 5, the metal layer 19 may also be formed between each of the side surfaces of the component main body 5 and the respective external electrodes 12 and 13.

Preferably, the metal layer 19, which contains Ti as described earlier, may mainly include an Ag—Cu—Ti alloy, for example.

The following description will describe the method for manufacturing the laminated ceramic electronic component 1, in particular, the method for forming the external electrodes 12 and 13. Additionally, upon explaining the method for forming the external electrodes 12 and 13, FIGS. 3 through 6 are also referred to, in addition to FIG. 2. Although FIGS. 2 through 6 only indicate a structure on the second external electrode 13 side, the structure on the first external electrode 12 side is also virtually the same as the structure of the second external electrode 13 side illustrated in the Figures.

First, a component main body 5 is prepared.

Figure 3:
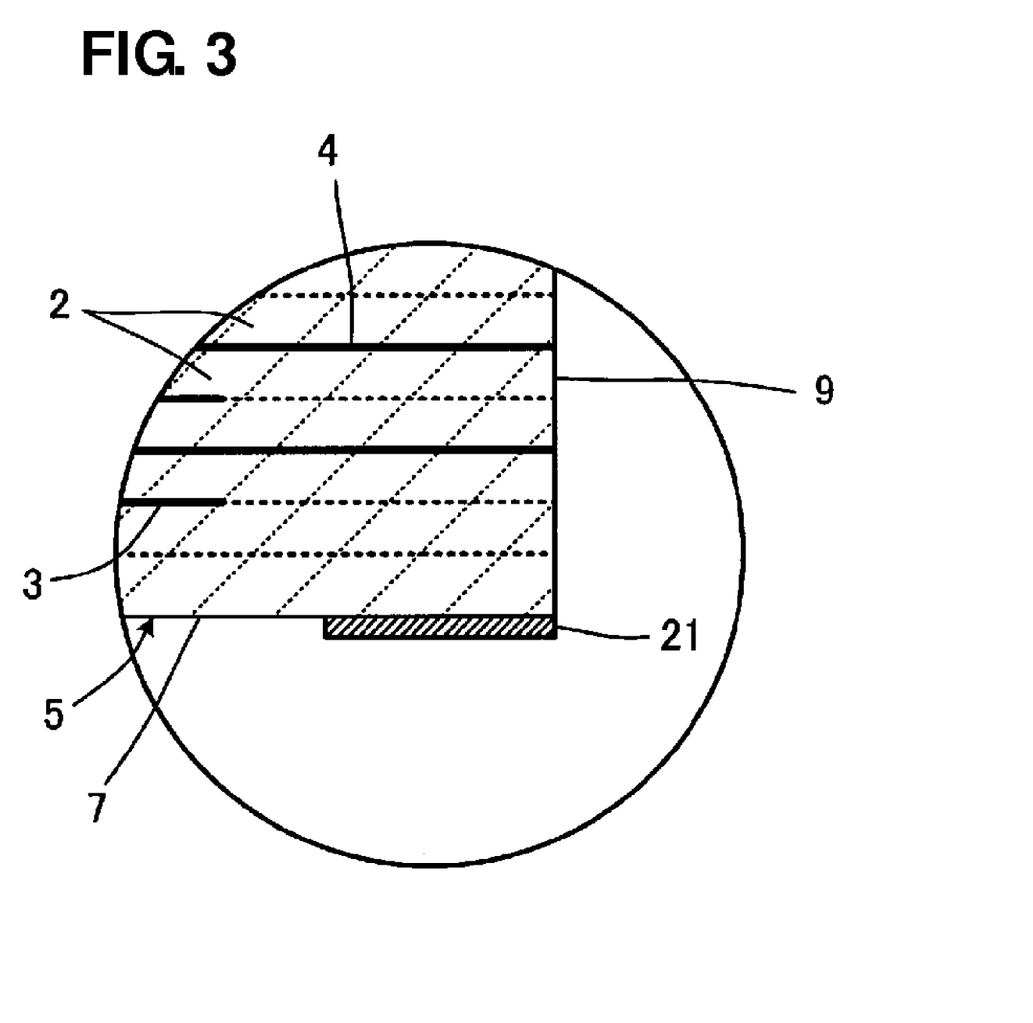
FIG. 3, which is a view that corresponds to FIG. 2 and explains a method for manufacturing the laminated ceramic electronic component 1 shown in FIG. 1, shows a state in which a brazing material 21 is applied thereto.

Next, as shown in FIG. 3, a brazing material 21 containing Ti is applied to at least one portion of a surface of the component main body 5 on which the external electrodes 12 and 13 are formed. In this preferred embodiment, the brazing material 21 is applied only to a ceramic portion except for the portions to which the inner electrodes 3 and 4 are exposed of the component main body 5. More specifically, the brazing material 21 is applied to the main surfaces 6 and 7 of the component main body 5, which are located near the end surfaces 8 and 9. The brazing material 21 may be prepared, for example, as a metal foil, or as a paste in which metal powder is dispersed in an organic vehicle. In addition to the aforementioned Ti, the brazing material preferably further includes Ag and Cu.

Figure 4:
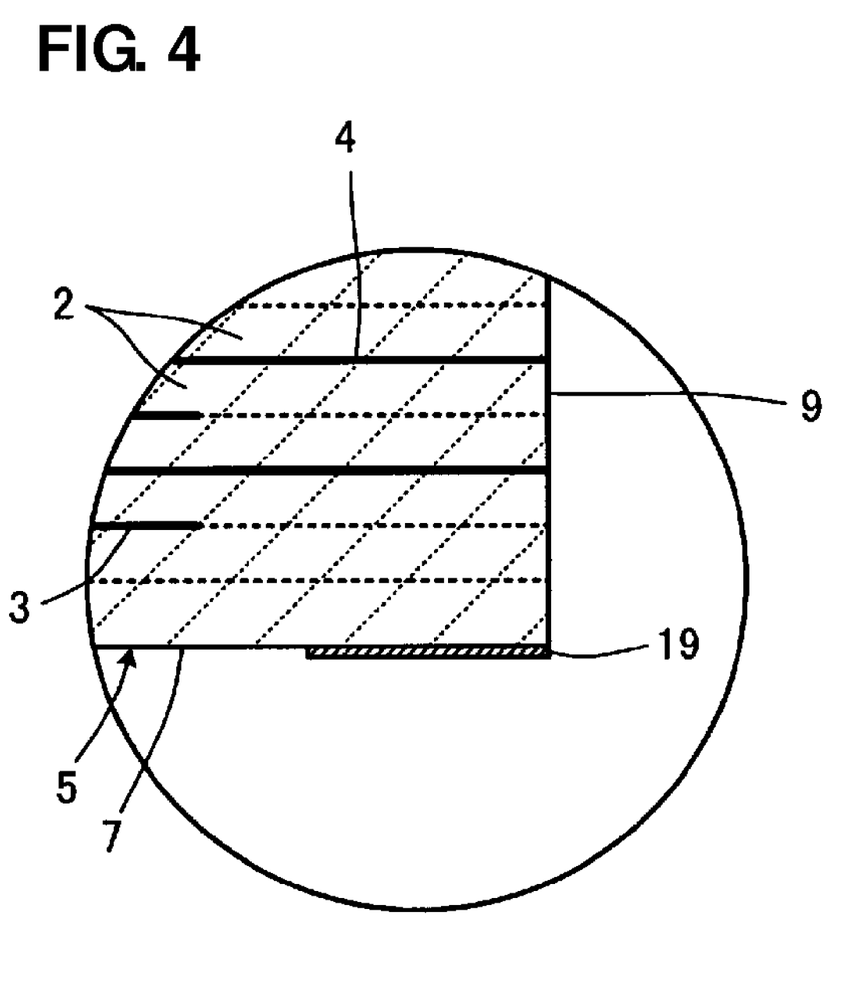
FIG. 4, which is also a view that corresponds to FIG. 2, and explains the manufacturing method, shows a state in which a metal layer 19 has been formed by baking the brazing material 21 shown in FIG. 3.

Next, a baking process for the brazing material 21 is carried out. By this process, the brazing material 21 provides a metal layer 19 formed on the surface of a ceramic portion of the component main body 5, as shown in FIG. 4. In this case, Ti contained in the metal layer 19 is firmly combined with the ceramic portion of the component main body 5 through oxygen so that the surface of the ceramic portion is metalized.

Figure 5:
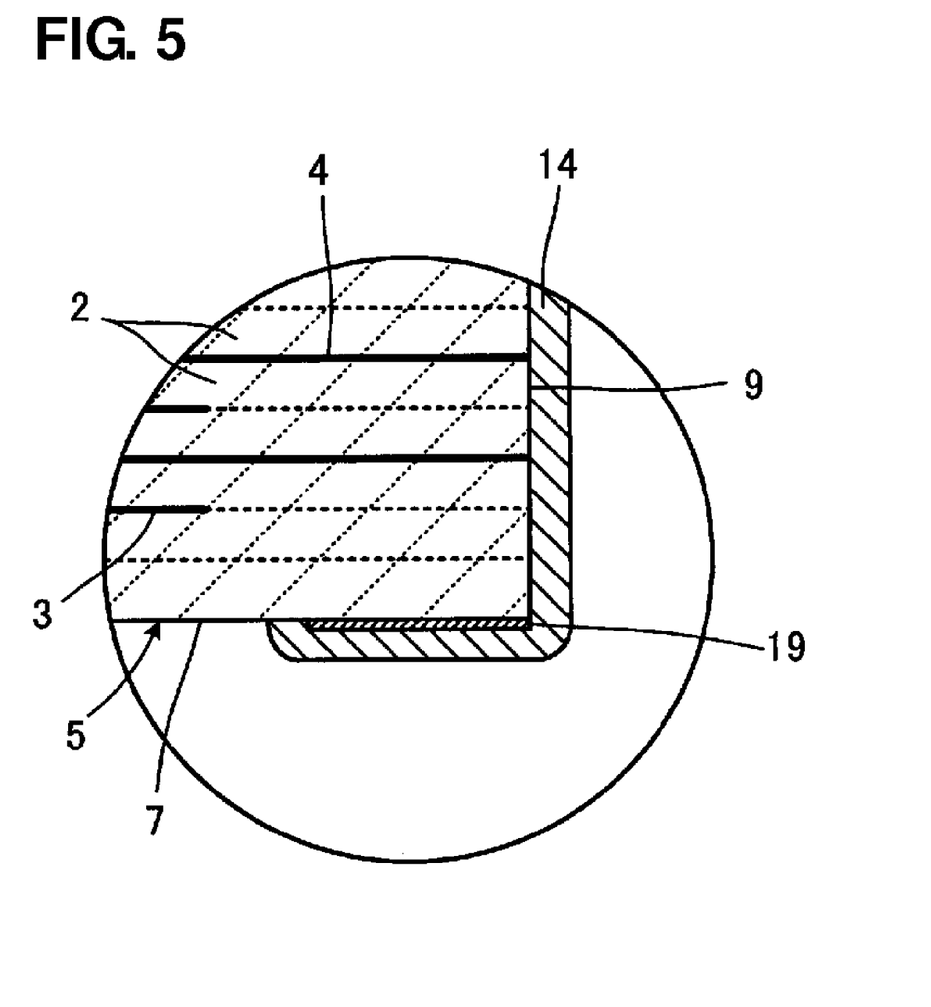
FIG. 5, which is also a view that corresponds to FIG. 2, and explains the manufacturing method, shows a state in which, after the metal layer 19 has been formed, a first plated film 14 that forms a base layer for an external electrode is formed.

Next, a plating process is carried out so as to cover at least a portion of the component main body 5 on which the metal layer 19 has been formed, and, as shown in FIG. 5, a first plated film 14 that forms the undercoat layer of each of the external electrodes 12 and 13 is formed. Upon carrying out this plating process, either an electrolytic plating process or an electroless plating process may be adopted.

In a case where the electrolytic plating process is adopted, a first plated film 14 is preferably formed by processes in which a plating liquid, the component main body 5 and a conductive medium are put in a container, and a current is applied thereto while being stirred. At this time, the plated film is deposited only on the conductive member, based upon the principle of the electrolytic plating. Therefore, with respect to the end surfaces 8 and 9 of the component main body 5, at first, the plating film is deposited only on the inner electrodes 3 and 4, as well as on the metal layer 9. However, when the current application is continuously carried out, the plating is allowed to grow so that adjacent plated deposits whose plating growths match with each other are crosslinked with each other to form a continuous plated film.

On the other hand, in the case when the electroless plating process is adopted, by allowing metal ions to be deposited as metal by the function of a reducing agent, a first plated film 14 is formed. In the electroless plating process, the deposition of the plated film takes place on a portion on which the catalyst exists. Therefore, a catalyst applying process for applying a catalyst, such as Pd, to the metal layers 19 respectively formed on the end surfaces 8 and 9, as well as on the respective main surfaces 6 and 7, of the component main body 5, is carried out. Alternatively, by preliminarily allowing the inner electrodes 3 and 4 and the metal layer 19 to contain metal having a catalyst function, it is possible to eliminate the necessity of separately carrying out the catalyst applying process. In the latter case, although, on the end surfaces 8 and 9 of the component main body 5, the plated film is deposited only on the exposed portions of the inner electrodes 3 and 4, as well as on the metal layer 19. However, in the same manner as in the aforementioned electrolytic plating process, the plating is allowed to grow so that adjacent plated deposits are crosslinked with each other to form a continuous plated film.

Figure 6:
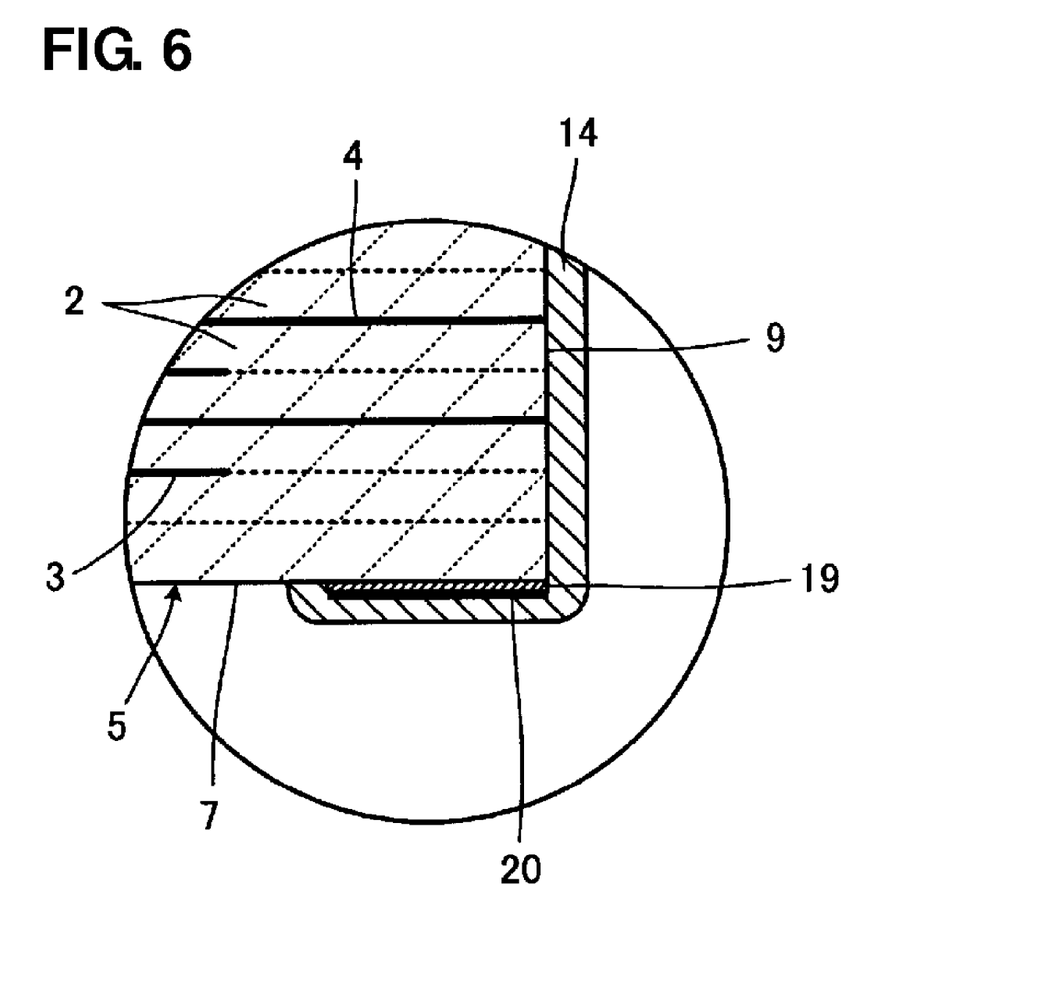
FIG. 6, which is also a view that corresponds to FIG. 2, and explains the manufacturing method, shows a state in which, after the formation of the metal layer 14, a heating treatment is carried out so that a counter diffusion layer 20 is formed.

Next, a heating process is carried out. With this arrangement, a metal-to-metal bond is formed between the first plated film 14 and the metal layer 19. FIG. 6 shows a state after the heating treatment. As a result of the heating process, a counter diffusion layer 20 having a thickness of about 0.1 μm or more, for example, is formed between the first plated film 14 and the metal layer 19, as shown in FIG. 6.

Next, a second plated film 15 and a third plated film 16 are successively formed on the first plated film 14. Consequently, a laminated ceramic electronic component 1, as shown in FIGS. 1 and 2, is completed.

Additionally, all of the first plated film 14, the second plated film 15 and the third plated film 16 on the external electrodes 12 and 13 are not required to be formed by using only either one of the electrolytic plating process and the electroless plating process, and any of the first to third plated films 14 to 16 may be formed by using a method different from that of the other films.

Moreover, the above-mentioned heating process is carried out after the first plated film 14 has been formed; however, the process may be carried out after the second plated film 15 has been formed, or after the third plated film 16 has been formed.

The laminated ceramic electronic component 1, explained according to various preferred embodiments of the present invention, is used for forming a laminated ceramic capacitor; however, the present invention may be adopted to provide other laminated ceramic electronic components, for example, a laminated chip thermistor, a laminated chip inductor, a laminated piezoelectric element and the like.

The following description will discuss experimental examples carried out so as to confirm the effects and advantages achieved by preferred embodiments of the present invention.

A laminated ceramic electronic component to be used as a sample, which forms a laminated ceramic capacitor, has a length of approximately 1.9 mm, a width of 1.05 mm and a height of 1.05 mm, as dimensions in its component main body. The ceramic layer includes a barium-titanate-based dielectric ceramic material, with its inner electrode mainly including nickel. Moreover, the number of laminated layers of the ceramic layers preferably is set to 416, and the thickness of each ceramic layer is set to 1.9 μm so that its electrostatic capacity is designed to be 10 μF.

In example 1, an Ag—Cu—Ti brazing material was formed near the end surface on each of the main surfaces of the component main body, with a thickness of 5 μm, and this was subjected to a baking process at a temperature of 800° C. for 10 minutes, under vacuum of $10^{-3}$ Pa or more, in example 2, an Ag—Cu—In—Ti brazing material was formed, with a thickness of 5 μm, and this was subjected to a baking process at a temperature of 800° C. for 10 minutes, under vacuum of $10^{-3}$ Pa or more, and in example 3, a brazing material paste, prepared by dispersing Ag—Cu—Ti powder in an organic vehicle (weight ratio of metal powder in the paste=85% by weight), was applied with a thickness of 5 μm, and this was subjected to a baking process at a temperature of 800° C. for 10 minutes under vacuum of $10^{-3}$ Pa or more.

In comparative example 1, on the other hand, in place of the application of the brazing material, a Ti film having a thickness of 5 nm was formed thereon by sputtering. In comparative example 2, neither the application of the brazing material nor the formation of the Ti film was carried out.

Next, on each of the component main bodies of examples 1 to 3 as well as comparative example 1 and 2, a first plated film forming an under coat layer for an external electrode was formed with a thickness of 7 μm, by carrying out a Cu electrolytic plating process. In this electrolytic plating process for forming the first plated film, a horizontal rotation barrel having a volume of 300 milliliters and the number of revolutions of 12 rpm was used, and a conductive medium, made of steel having a diameter of 1.8 mm, was also used. Moreover, a plating liquid, commercially available as "Pilobright Process" made by C. Uyemura & Co., Ltd., was used under conditions of a temperature of 55° C. and a pH value of 8.8, and the plating process was carried out at a current density of 0.30 A/dm$^2$ for 60 minutes.

Next, each of the component main bodies of examples 1 to 3 as well as comparative examples 1 and 2 was subjected to a heating treatment at a temperature of 800° C. for 2 hours under an atmosphere of an oxygen partial pressure of less than 5 ppm.

Next, by using the same horizontal rotation barrel as that used for the plating process of the first plated film, a second plated film, made of an Ni plated film with a thickness of 4 μm, was formed on the first plated film. In this Ni plating process, a watt bath (acidulous simple Ni bath) was used as the plating liquid, and the Ni plating process was carried out under conditions of a temperature of 60° C. and a pH value of 4.2, at a current density of 0.20 A/dm$^2$ for 60 minutes.

Next, on the second plated film, a third plated film, made of an Sn plated film having a thickness of 4 μm, was formed by using the same rotation barrel as described earlier. In this Sn plating process, a plating liquid, commercially available as "Sn-235" made by DIPSOL CHEMICALS Co., Ltd., was used under conditions of a temperature of 30° C. and pH 5.0, and the plating process was carried out at a current density of 0.10 A/dm$^2$ for 60 minutes.

Figure 7:
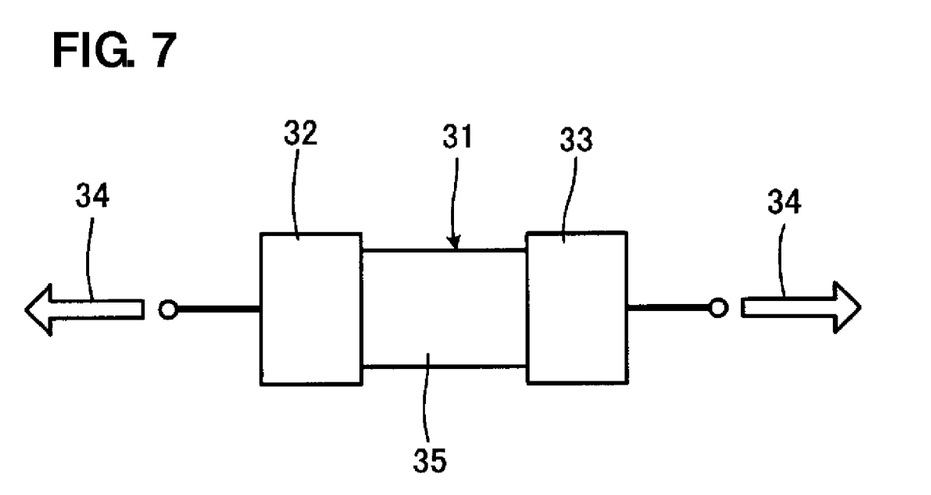
FIG. 7 is a view that explains an evaluation method for the adhesion strength of an external electrode that is carried out in an experimental example.

With respect to each of the laminated ceramic capacitors of examples 1 to 3, as well as comparative examples 1 and 2, obtained as described above, the adhesion strength of the external electrode was evaluated. In this adhesion strength evaluation, as shown in FIG. 7, loads 34 were applied to respective external electrodes 32 and 33 of a laminated ceramic capacitor 31 serving as a sample in mutually separating directions so as to cause a shear fracture in the laminated ceramic capacitor 31; thus, the loads 34 were applied at a load velocity of 0.5 mm/s until a fracture occurred, and the fracture mode at the time of occurrence of the fracture was observed.

As a result, in examples 1 to 3, the fracture occurred inside the component main body installed in the laminated ceramic capacitor 31; in contract, in comparative examples 1 and 2, the fracture occurred in the interface between the second plated film and the component main body. This fact indicates that, in accordance with examples 1 to 3, the adhesion strength of the first plated film is enhanced.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A method for manufacturing a laminated ceramic electronic component including a plurality of laminated ceramic layers and an inner electrode that is formed along an interface between the ceramic layers, and comprises a component main body having first and second main surfaces opposing each other, first and second end surfaces that connect the first and second main surfaces with each other, and first and second side surfaces, with one portion of an end edge of the inner electrode being exposed to at least one of the first and second end surfaces of the component main body, and an external electrode that is formed at least on the end surface of the component main body to which the inner electrode is exposed, the method comprising the steps of:
    preparing the component main body;
    applying a brazing material containing Ti to at least one portion of a surface of the component main body where the external electrode is to be formed;
    baking the brazing material so that a metal layer is formed on the component main body;
    carrying out a plating process so that a plated film that forms at least one portion of the external electrode is formed so as to cover at least a portion to which the inner electrode is exposed and a portion in which the metal layer is formed in the component main body; and
    carrying out a heating process so that a counter diffusion is caused between the metal layer and the plated film.

2. The method for manufacturing a laminated ceramic electronic component according to claim 1, wherein in the step of applying the brazing material, the brazing material is applied only onto a ceramic portion except for the portion to which the inner electrode is exposed in the component main body.

3. The method for manufacturing a laminated ceramic electronic component according to claim 1, wherein the brazing material further comprises Ag and Cu.

4. An electronic ceramic component comprising:
    a plurality of laminated ceramic layers and an inner electrode that is arranged along a specific interface between the ceramic layers arranged to define a component main body having first and second main surfaces that oppose each other, first and second end surfaces that connect the first and second main surfaces with each other, and first and second side surfaces, with one portion of an end edge of the inner electrode being exposed to at least one of the first and second end surfaces of the component main body;

an external electrode that is disposed at least on the end surface of the component main body to which the inner electrode is exposed and made of a directly-plated material;
a metal layer containing Ti that is located between the component main body and the external electrode; and
a counter diffusion layer having a thickness of about 0.1 μm or more that is located between the external electrode and the metal layer.

5. The electronic ceramic component according to claim 4, wherein the metal layer is located only on a surface of the ceramic portion except for the portion to which the inner electrode is exposed in the component main body.

6. The electronic ceramic component according to claim 4, wherein the metal layer mainly includes an Ag-Cu-Ti alloy.

* * * * *